Nov. 22, 1966  F. J. BURG  3,286,483
COLD SERVER WITH HOLDOVER MEANS
Filed Sept. 8, 1964
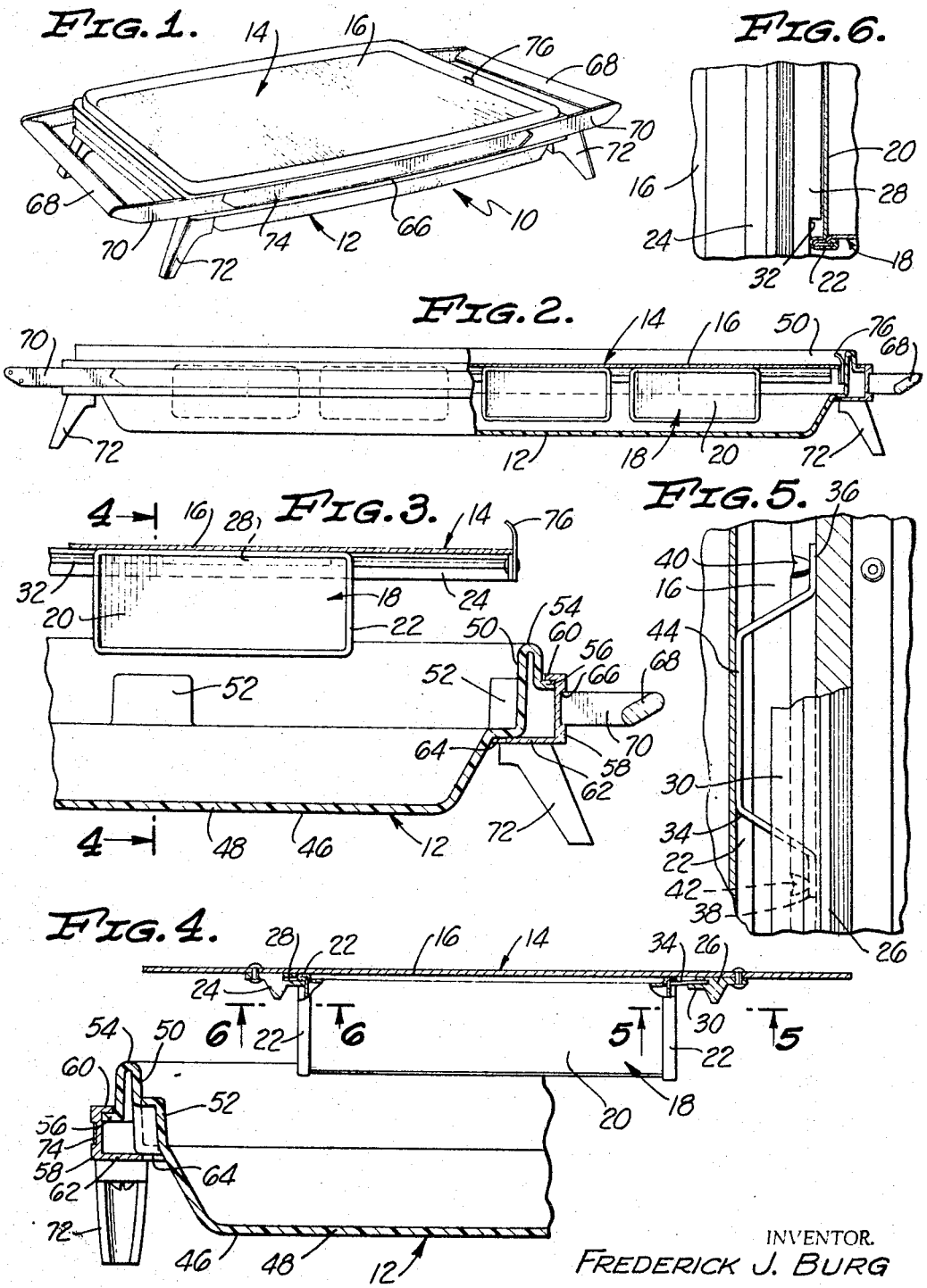
INVENTOR.
FREDERICK J. BURG
BY
EDWARD D. O'BRIAN
ATTORNEY

United States Patent Office 3,286,483
Patented Nov. 22, 1966

3,286,483
COLD SERVER WITH HOLDOVER MEANS
Frederick J. Burg, Bellrose, N.Y., assignor to Salton, Inc., New York, N.Y., a corporation of New York
Filed Sept. 8, 1964, Ser. No. 394,950
2 Claims. (Cl. 62—371)

This invention is directed to a cold server, particularly of the nature of a tray type server especially adapted to maintain food material cold during its display and serving.

The use of trays in serving food materials is very old, and such serving of hot foods has been improved over the years by the provision of trays which maintain a tray temperature adequate to keep warm foods palatable. The serving of cold foods, however, has been unsatisfactory, especially in warm climates and especially after the foods have been absent for some time from a cold environment such as is provided by a household refrigerator.

Accordingly it is an object of this invention to provide a cold server generally in the form of a tray particularly adapted for the serving and/or display of food materials which maintains the food materials cold for a substantial length of time after they are removed from a refrigerated environment. It is another object of this invention to provide a cold server which removes heat from such foods being served and/or displayed by the use of a heat sink which is not connected to an external source of power. It is another object of this invention to provide a cold tray which can be inexpensively manufactured, provides a pleasing appearance, is easy to clean and maintain, provides ready handling of the heat sink and has a long trouble free life.

Other objects and advantages of this invention will become apparent upon a study of the following portion of this specification, the claims and the drawings in which:

FIG. 1 is an isometric view of the cold server of this invention;

FIG. 2 is an enlarged side elevation of the cold server, taken partly in sections;

FIG. 3 is a further enlarged partial section taken in side elevation of one end of the cold server of this invention;

FIG. 4 is an enlarged partial transverse elevational section of the cold server of this invention;

FIG. 5 is an enlarged view taken along the line 5—5 of FIG. 4; and

FIG. 6 is an enlarged view taken along the line 6—6 of FIG. 4.

As an aid to understanding this invention it can be stated in essentially summary form that it is directed to a cold server having a food material receiving tray. Removably secured to the bottom of the tray are a plurality of heat sinks which are capable of being refrigerated and which are particularly designed to require a large amount of heat to raise their temperature from their refrigerated temperature to the ambient temperature around the cold server. The tray and the heat sinks are removably mounted within a housing which inhibits the heat sinks from receiving heat from other sources in the tray, and the housing also serves as a decorative housing, and as a support for suitable supporting legs and handles.

This invention will be understood in greater detail by reference to the following portion of this specification wherein the drawings are referred to in detail. The cold server is generally indicated at 10 and primarily comprises housing 12 carrying deck 14.

As is best seen in FIGS. 2, 3, 4, 5 and 6, the deck 14 comprises a deck plate 16 which has a substantially planar upper surface for the carrying and support of food materials or vessels containing food materials. The deck plate 16 is preferably made of a material having high heat conductivity and which is of such nature as to be readily cleaned and non-contaminating with respect to the food materials. Several of the common stainless steels meet these requirements, and some of the aluminum alloys are also eminently suitable.

The underside of deck plate 16 carries heat sinks 18. Four such heat sinks are shown attached to the bottom of a deck plate 16 in the instant cold server, but the number of such heat sinks used depends primarily upon the size of such heat sinks and the size of the deck plate 16. Any convenient number can be used. The heat sinks 18 are conventionally furnished in flat sided metallic cans 20 having conventional beaded end edges 22, of such nature as are made on standard can making machinery. The material in each of the heat sinks 18 is preferably a material which changes phase from solid to liquid in the region of the freezing point of water, and which has a high heat of fusion as it changes from a solid to liquid phase. The heat of fusion is preferably at least as high as that of ice. It is also desirable that both the solid phase and liquid phase have a high specific heat so that the maximum amount of heat can be absorbed in each of the heat sinks 18 as they are warmed from a subcooled solid condition to a temperature approaching the ambient in which the cold server is used.

In order to maintain the deck plate 16 cool, each of the heat sinks 18 is secured to the bottom side thereof so that one side of each of the flat sided cans 20 is closely adjacent the underside of the deck plate 16. For convenience in use, each of the heat sinks 18 is arranged to be detached from the underside of deck plate 16 so that the heat sinks 18 may be placed in a freezer for the cooling thereof prior to use of the cold server. To secure the sinks 18 to the underside of the deck plate 16 rails 24 and 26 are secured to the underside of deck plate 16. Rails 24 and 26 are of extruded nature and respectively carry flanges 28 and 30 extending parallel to the underside of the deck plate and facing each other. As is seen in FIG. 6, flange 28 has recesses 32 formed periodically therein. The spacing between the recesses 32 is substantially equal to the dimension across the beaded end edges 22 in the longer cross sectional direction through the flat sided cans 20. Thus, the bead 22, see FIG. 4, can be inserted beneath the flange 28, adjacent the underside of deck plate 16 for the retention of that end of the can 20 with respect to the deck plate 16.

The other end of each of the cans 20 is secured adjacent deck plate 16 by means of a generally U-shaped spring 34, see FIG. 5, which has its legs 36 and 38 slidably retained under the flange 30 by means of bosses 40 and 42, respectively. The springs 34 extend outwardly from under the flange 30 to permit the retainer portion 44 thereof to extend beneath bead 22 and thus under the can. The spacing between the rails 24 and 26, the dimensions of flanges 28 and 30, and the extensibility of the retainer section 44 of the spring are so proportioned that one of the heat sink cans 20 can be mounted adjacent the underside of the deck plate 16 by placing the bead 22 on one end of the can 20 under the retainer section 44 of the spring, pressing the can 20 and spring 34 to the right, as seen in FIG. 4, placing the bead 22 on the other end of the can 20 under the flange 28 and releasing it. Thereby the can 20 is retained in place. This structure is repeated for each of the heat sink cans 20.

The housing structure 12 is primarily comprised of a pan 46 formed with a depressed bottom 48 and interior edge defining walls 50. The walls 50 are of such configuration as to reasonably closely fit the horizontal terminal edges of the deck plate 16 so that the deck 14 fits therein, as seen in FIG. 2. The walls 50 are formed with projections 52 which form seats upon which the deck 14 rests.

The inner edge defining wall 50 extends upwardly and outwardly to form a top edge 54 and then downwardly and again outwardly to form the outer edge 56. Frame 58 is provided around pan 46. Frame 58 is formed of a generally U-shaped extrusion having a short inwardly projecting leg 60 and a longer inwardly projecting leg 62. The short leg 60 extends over the outer edge 56 of pan 46 and the leg 62 extends under shoulder 64 of the pan 46. The frame 58 is of such configuration as to extend all the way around the pan 46 to finish off its outer edge. The frame 58 is provided with a recess 66 to which handles 68 are mounted by means of handle brackets 70. Legs 72 are secured to the frame 58 to hold the housing 12 above a surface upon which the cold server 10 may be rested. A decorative strip 74 may be inserted in the recess 66, should such be desirable. Handles 76 are provided on the deck plate 16 to permit lifting out of the deck 14 for access for the heat sinks 18.

In use, the cold server 10 is first disassembled by lifting the handles 76 to remove the deck plate 16. Then the heat sinks 18 are removed by pressing them toward the spring 34 until the opposite end edge bead 22 can be removed from under flange 28. Each of the heat sinks is removed by this method, and each is placed in a subfreezing environment, such as a household freezer. After the heat sinks 18 substantially reach the freezer temperature, they are removed therefrom and reinserted under deck plate 16 by pressing one of the beaded end edges 22 underneath the spring 34 until the opposite beads 22 can enter under flange 28. After that bead is placed under flange 28, the spring 34 is allowed to move the heat sinks 18 axially so that the bead 22 is locked under flange 28. Each of the heat sinks 18 is installed and the deck 14 is placed in the housing 12. The housing 12 is of such nature that its bottom 48 provides sufficient clearance under the heat sinks 18 and the housing 12 is preferably made of low thermal conductivity material such as plastic, and is completely closed along its bottom 48 and sides. Thus, convection is limited around the heat sinks 18 and the housing 12 is of low thermal conductivity so that little heat enters the heat sinks from below.

However, since the deck plate 16 is in good thermal relationship with respect to the heat sinks 18, the surface thereof rapidly cools down. Food materials are either placed directly upon the top surface of deck plate 16, or are placed in vessels resting thereon. Such vessels are preferably metallic, for metallic vessels have a considerably greater thermal conductivity than glass or polymer composition vessels. Thus, the food materials placed upon the deck plate 16, either in direct contact thereof or in metallic vessels in direct contact therewith are maintained at a temperature below normal room temperature by the heat capacity of heat sinks 18. The heat sinks 18 have enough capacity to maintain the food materials at a reasonably depressed temperature below normal room temperature for a reasonable length of time. However, should a longer time of cooling be desirable, the heat sinks 18 themselves may be exchanged for others on a regular basis so that continuous cooling is possible.

This invention has been described in its preferred embodiment and it is clear from the above description that it is susceptible to numerous modifications and embodiments without the exercise of the inventive faculty. Accordingly, the scope of this invention is defined by the scope of the following claims.

I claim:

1. A food server adapted to serve food materials and adapted to maintain such food materials at a temperature below normal room ambient temperature, said food server comprising a deck, said deck being made of a material of relatively high thermal conductivity, such deck having a substantially planar top surface and a bottom surface, heat sink means detachably secured to said bottom surface, said heat sink means containing a material having a phase change from solid to liquid at approximately the same temperature as the fusion point of ice and having a heat of fusion at least equal to the heat of fusion of ice, said heat sink being in thermal continuity with respect to the top of said deck, a housing arranged for the support of said deck, said housing having edge defining walls and having a bottom, said housing being continuous from said edge defining walls through said bottom, projections integrally formed with said edge defining walls extending inwardly with respect to said edge defining walls, said projections being arranged to support said deck, said bottom of said housing being spaced from said heat sink means when said deck is mounted on said projections, said housing being made of a material of relatively low thermal conductivity, a frame positioned around said housing, said frame engaging said housing so that said frame is rigidly positioned with respect to said housing, handle means on said frame, said handle means being adapted for the manual lifting of said frame, said housing and said deck plate positioned therein, legs secured to said frame, said legs being arranged to support said housing so that the bottom of said housing is positioned away from a supporting surface.

2. The food server of claim 1 wherein first and second rails are secured to the lower side of said deck substantially parallel to each other, a flange on each of said rails, said flanges of said first and second rails facing each other, said first flange having spaced recesses cut therein, said second flange having a U-shaped spring secured between said flange and the bottom of said deck; said heat sink means comprising a flat sided vessel having beaded end edges, said first flange and its recesses and said second flange and its spring being of such configuration and spaced from each other so that said can is detachably retained by said first flange and by said spring.

References Cited by the Examiner

UNITED STATES PATENTS

| 585,782 | 7/1897 | Phillips | 62—457 |
|---|---|---|---|
| 2,713,779 | 7/1955 | Fitzgibbons | 62—384 |
| 2,781,643 | 2/1957 | Fairweather | 62—372 |

FOREIGN PATENTS

| 422,903 | 4/1933 | Great Britain. |

ROBERT A. O'LEARY, *Primary Examiner.*

N. R. WILSON, *Assistant Examiner.*